United States Patent Office 3,531,353
Patented Sept. 29, 1970

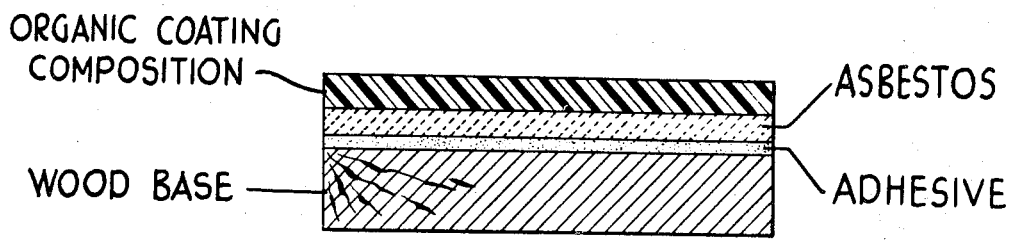

3,531,353
METHOD OF COATING WOOD
Rowland S. Hartzell, Gibsonia, and Gene Gerek, Cheswick, Pa., assignors to PPG Industries, Inc., Pittsburgh, Pa., a corporation of Pennsylvania
Filed June 29, 1966, Ser. No. 561,625
Int. Cl. B32b 19/04, 21/08, 27/12
U.S. Cl. 156—327
11 Claims

ABSTRACT OF THE DISCLOSURE

Durable, composite wood articles comprise a wood material base and bonded to an exposed surface thereof a layer of asbestos having thereon an organic resin finish. The use of asbestos sheet material in this manner permits the coating of wood articles with heat-curing or heat-fusing resins which require baking at temperatures which are sufficient to cause deterioration of the wood material.

This invention relates to coated wood products, and the method of producing such products, and, more particularly, to novel resin-coated, wood articles in which coated asbestos sheet material is bonded to the surface of the wood.

Generally, wood articles are coated by first applying a suitable primer or sealer that makes the wood surface non-absorptive of liquid so that finishing coats will remain on the surface. Then successive coats are applied until the desired thickness is reached. While this method is usually sufficient to give desirable appearance and protection, it is found that durability is often lacking.

Although the fact that the substrate is wood may have little effect on the behavior of the coating during the first year or two, later on, when the coating has become sufficiently embrittled with age, the coating begins to disintegrate. This is believed to be the result of both the relatively low dimensional stability of wood as compared with other materials, such as metals, and the necessity for the use of coatings which do not require high temperatures for fusion or curing and which, therefore, are not sufficiently durable. As a consequence, coated wood surfaces which are exposed to weathering, such as exterior woodwork on houses, must be repainted at short time intervals to maintain the desired appearance and protect the wood. Since, in most cases, this time cycle is about once every 3 or 4 years, the cost of repainting soon exceeds the value of the wood.

Plywood and similar wood articles have been developed to both improve the dimensional stability of wood, and also to provide lower cost wood products. But although the resulting products have demonstrated significant usefulness, it is also evident that durability remains a serious problem. This deficiency is again probably related to the nature of the wood itself, as well as to the fact that face plies are often more susceptible to weathering than solid lumber of the same kind of wood. Also, the most abundant and least expensive plywood is usually faced with rotary-cut veneer having flat grained faces that display wide bands of summer wood. Such surfaces require a careful choice of primers and paints for satisfactory results.

Plywood, solid lumber and other wood articles have been modified in different ways to improve the durability of coatings applied thereto. For instance, face veneers have been acetylated to improve dimensional stability and treated with phenolic-type resins to obtain better paintability. Also, coverings, or overlays, made of paper impregnated with phenolic resins, finely ground wood and other substances, have been employed as veneers to provide a surface capable of sustaining coatings. But such modifications have been concerned primarily with preparation of the wood surface and usually have employed only conventional coatings. As a result, even though the durability of plywood coatings, for example, has been improved, it still is limited to the disadvantages inherent in such process, namely, the necessity for frequent and costly recoating. Also, due to the narrow scope of the modifications, such surfaces have not been adapted to coating with highly resistant baked-type finishes and usually cannot be coated by processes requiring temperatures in excess of about 180° F. without a resultant decrease in stability of the product.

It has now been discovered that extraordinarily durable resin-coated wood articles can be prepared by bonding the uncoated side of a resin-coated asbestos sheet to the wood surface. The asbestos sheet material can be easily coated with organic coating compositions, including those requiring high-temperature baking, and this coated sheet material can then be readily bonded to a wood surface utilizing conventional laminating adhesives. The composite coated wood article, as shown in the drawing, thus comprises a wood material base, an adhesive layer, a layer of asbestos bonded to the wood material by means of the adhesive layer, and a layer of an organic coating composition covering the asbestos layer.

An especially desirable feature of the process of this invention is the use of asbestos sheet material. This material possesses excellent heat stability and can be coated and baked at high temperatures without any structural impairment. This permits the use of thermosetting resins or resins which require heat for fusion, such as vinyl halide dispersion and solution coatings. The resultant coatings have outstanding durability and, when used as coatings for exterior woodwork, remain serviceable for periods of up to about 20 years, thereby eliminating the costly recoating processes which were previously employed. Furthermore, in the construction area, the coating does not have to be applied at the construction site, which is necessary with conventional painting processes.

The asbestos sheet material provides the same benefits obtained with the conventional overlays used to modify wood surfaces, such as, for example, excellent dimensional stability, and also gives flexibility and impact resistance to the coatings, the latter qualities being especially useful when the wood articles are to be machined after coating. Also, the high flammability limits of asbestos make them even more valuable, as for example, in house construction where high fire ratings are essential.

Although the process of this invention is adaptable to wood surfaces in general, it is particularly useful with plywood since the coated sheet, which is, in fact, the desired coating in completely finished condition, can be laminated to the facing veneer during the plywood laminating process, using the same equipment and adhesives. The coated plywood is then ready to be put to any use, especialy as construction material exposed to weather-ing, and the separate coating step, which would have been necessary heretofore is completely obviated.

The composite wood articles of this invention may be employed for a great number of uses, such as, for example, siding, sash, doors, casket stock, general millwork, framing material, and similar applications, and especially in exterior applications where the wood is exposed to weathering. Because of the decorative properties which may be obtained by a proper selection of color pigments, gloss and pattern effects, the method may be employed where aesthetic finishes are desired. For example, this coated asbestos material can be embossed or printed with a good grain pattern, the latter modification being especially valuable on interior hardboard paneling.

The organic coating composition employed can be selected from a broad group of both thermoplastic and thermosetting resins, including elastomeric resins, the choice being dependent only upon the conditions to which the completed structure is subjected. Where flexibility is a primary property, thermoplastic resins may be employed; whereas, if high temperature resistance or hardness is of greater importance, a thermosetting resin may be used. Blends of the two types of resins can also be used where desirable.

Among the various resins which are the most useful for this invention are:

*Vinyl halide resins.*—This group includes poly(vinyl chloride), poly(vinyl fluoride), poly(vinylidene chloride) and poly(vinylidene fluoride), as well as interpolymers of the same with other copolymerizable monomers, such as vinyl acetate.

*Alkyd resins.*—This group includes the well-known oil-modified glyceryl phthalate resins, as well as any of the saturated or unsaturated alkyd resins utilized in the coating field, produced from any polybasic acid and polyfunctional acids as phthalic acid, maleic acid, fumaric acid, isophthalic acid, and the like, as well as from anhydrides or such acids. The polyfunctional alcohol can be, for example, glycerine, sorbitol, ethylene glycol and diethylene glycol and similar polyols.

*Hydrocarbon resins.*—Included here are polyethylene, polypropylene, polybutadiene, polyisobutylene and polystyrene resins, as well as interpolymers of the same, such as polyethylene-propylene and polyethylene-propylene-diene terpolymer resins.

Escpecially useful are the elastomeric materials, such as hydrocarbon rubbery polymers, including those modified by halogenation or sulfonation. Such rubbery polymers include the polymers prepared by the simultaneous chlorination and chloro-sulfonation of polyethylene ("Hypalon") as well as the elastomeric materials based on 2-chlorobutadiene-1, 3 (neoprene), 2-methylpropene (butyl rubber) or 3-methyl-1, 3-butadiene (isoprene).

*Acrylic resins.*—This group includes the thermoplastic actylics such as the polymers and copolymers of the esters of acrylic and methacrylic acids, e.g., poly(methyl methacrylate). Especially useful acrylic resins are the hydroxyl-containing acrylic polymers which are usually combined with an amine-alydehyde resin or an epoxy resin to form a thermosetting composition. Representative interpolymers of this type include a hydroxyalkyl ester of an unsaturated carboxylic acid, for example, hydroxyethyl methacrylate, hydroxypropyl methacrylate, hydroxyethyl hydrogen fumarate, and others. These are interpolymerized with one or more other ethylenic monomers, such as styrene, 2-ethylhexyl acrylate, methyl methacryllate, butyl methacrylate, ethyl acrylate, butyl acrylate, acrylonitrile, acrylic acid, and methacrylic acid. Certain compositions and interpolymers containing hydroxyalkyl esters are described in U.S. Pats. 2,681,897; 3,002,959, and 3,082,184, and in copending application Serial No. 277,678, filed Apr. 30, 1963.

Other thermosetting acrylics such as aldehyde-modified amide interpolymers containing crosslinking functional groups such as methylol or alkoxymethyl groups are also especially useful. Examples of this class are shown in U.S. Pat. Nos. 2,870,117; 2,978,437; 3,037,963, and 3,079,434. These interpolymers comprise an unsaturated carboxylic acid amide such as acrylamide with one or more other ethylenic monomers, with the amide groups being reacted with an aldehyde and, usually, an alcohol.

*Amino resins.*—Included within this group are amine-aldehyde resins; that is, the aldehyde condensation product of melamine, urea, acetoguanamine, or a similar compound. Generally, the aldehyde employed is formaldehyde, although the products can be made from other aldehydes, such as acetaldehyde, benzoaldehyde, and others. While resins produced from melamine or urea are most common and are preferred, condensation poducts of other amines or amides can also be employed, for example, that of triazines, diazines, guanamines, and alkyl and aryl-substituted derivatives of such compounds, including alkyl and aryl-substituted ureas and alkyl and aryl-substituted melamine, provided at least one amino group is present. Some examples of such compounds are N,N'-dimethyl urea, benzyl urea, ammeline, triaminopyrimidine, 2,4,6-triphenyl triamino-1,3,5-triazine, and the like.

*Epoxy resins.*—This group includes the well-known epoxy resins obtained by reaction of polyphenols with epichlorohydrin, such as, for example, the product of the reaction of 2,2-bis (4-hydroxyphenyl)propane and epichlorohydrin. Also useful are: reaction products of epichlorohydrin and a low molecular weight condensation producnt of formaldehyde and a phenol or alkylphenol, commercially known as Novolak resins; epoxy esters such as those prepared by esterification of epoxy resins with fatty or rosin acids; and epoxidized oils such as epoxidized soybean oil.

*Polyester resins.*—This class includes materials made from glycols such as propylene glycol, diethylene glycol and dipropylene glycol, unsaturated acids and anhydrides, such as maleic anhydride and fumaric acid, monomers such as styrene, vinyl toluene and methyl methacrylate and saturated acids such as isophthalic and adipic acid.

*Organopolysiloxane resins.*—This group includes methyl and phenyl organopolysiloxane resins, such as dimethyltriphenyltrimethoxytrisiloxane, as well as others represented by the general unit formula:

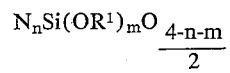

where R is a monovalent organic radical bonded to silicon bond and R' is hydrogen, an alkyl radical, an aryl radical, or an acyl radical. The value of $n$ in the above formula is between about 0.5 and 1.9 and the value of $m$ is between 0.01 and 2.5; the value of $m$ plus $n$ is between 0.51 and 3. Also included are the flexible organopolysiloxanes known as silicone rubber.

*Phenolic resins.*—This group includes phenolformaldehyde resins such as those made from phenol, cresol and xylenol and substituted phenols such as p-phenpylphenol and p-tertiary-amylphenol. Rosin-modified and other terpene-modified phenolics can also be used.

It is often advantageous to use compatible combinations of the above thermosetting and thermoplastic resins, such as, for example, combinations of aldehyde-modified, unsaturated carboxylic acid amides resins and poly(vinylidene fluoride) resins.

A preferred coating composition comprises a blend of aldehyde-modified, ethylenically unsaturated carboxylic acid amide interpolymers, such as those described in U.S. Pat. Nos. 3,307,963; 2,870,117; 2,978,437; and 3,079,434, and polymers of vinylidene fluoride, especially such compositions wherein the vinylidene fluoride polymer constitutes about 90 percent by weight of the combination.

The asbestos sheet material employed in the invention comprises a layer of material containing asbestos in a major proportion. Such a layer may be woven or non-woven asbestos cloth, bonded asbestos fiber fabrics, asbestos paper, and similar layers which can be coated with organic coating compositions and subsequently bonded to wood.

The term asbestos does not refer to a distinct mineral species, but is a commercial term applied to fibrous varieties of several minerals differing widely in composition, strength and flexibility.

Chemical and mineralogical studies show that asbestos is of mineral origin, of which the most abundant variety is chrysotile. Other varieties are crocidolite, amosite, anthophyllite, termolite and actinolite. The chrysotile is classified as being of the serpentine family, whereas the others are of the amphibole family. The chemical feature common to all asbestos is that they are hydrated silicates with the degree of hydration varying from about 1 percent in some types to as much as about 14 percent in most kinds of chrysotile. It is generally accepted that asbestos is a metamorphic product derived from certain types of silica-bearing minerals. Asbestos is generally as dense as the rock in which it occurs but forms masses of fibers. Specific gravity of the fibers ranges from 2.5 for chrysotile to 3.3 for the other types. Asbestos can be subdivided into fibers so fine that only the electron microscope will reveal them. The finest fibers are found in chrysotile. Its basic single fiber is a smooth cylinder approximately 180 A. in diameter (0.00000071 inch).

Asbestos cloths comprise a wide selection of styles, textures, weights and thicknesses. In woven asbestos, the most commonly used weaves are: plain, herringbone, twill and broken twill. The quality or grade of asbestos cloths, determined by the per cent asbestos content, may also vary and includes a commercial grade of between 75 and 80 percent asbestos, as well as Grade AAAA, which contains up to 100 percent asbestos. Varying chemical and physical properties, such as heat resistance and solvent resistance, can be obtained by combining asbestos with other fibers and materials, including cellulose acetate fibers, glass fibers, and brass wire.

Nonwoven asbestos cloths are made from yarns of asbestos bonded together, usually at right angles. A number of binders are available, such as natural and synthetic rubbers, plastics, such as polyvinyl chloride, synthetic resins, and various gums and glues.

Bonded fiber fabrics comprise a random arrangement of the asbestos fibers. Bonding may be achieved by the use of thermoplastic binders, either alone or blended with nonthermoplastic binders. They can be heat-treated with suitable solvents to cause mutual adhesion. Alternatively, the various asbestos fibers may be bonded together by addition of bonding agents, as employed in the nonwoven cloths.

Asbestos paper is prepared using equipment and production techniques closely resembling those of ordinary cellulose paper making. High purity asbestos paper, consisting entirely of asbestos fiber, may be used, although preferably a binder, as above, is employed for reinforcement. Other materials may be combined with the asbestos, analogous to the asbestos cloth substituents, such as thermosetting and thermoplastic resins, glass cloth, and asphalt.

There may also be employed asbestos sheet material in which a layer of another substance, such as glass fibers or other reinforcement, is interposed between layers of asbestos.

The wood material used in this invention comprises a layer of a material which is capable of being coated and has, as a major component, a substance which is principally composed of cellulose and lignin and also can include extractives and ash-forming minerals. Cellulose $(C_6H_{10}O_5)_n$ is the preponderant and essential constituent of wood. Lignin is the major noncarbohydrate constituent of wood and functions as a natural plastic binder for the cellulose fibers. The ash-forming minerals, which are left as ash when the lignin and cellulose are burned, and the extractives, which are not part of the wood structure but contribute to the wood such properties as color, odor, taste and resistance to decay, usually constitute the remaining portion of the wood. The extractives include tannin, starch, coloring matter, oils, resins, fats and waxes and can be removed from the wood, if desired, by neutral solvents such as water, alcohol, acetone, benzene and ether.

A preferred wood material is plywood, and other useful materials include solid lumber, hardboard, particle board and the like.

Plywood is a cross-banded assembly made of layers of veneer, or veneer in combination with a lumber core, particle board core or other type of composition material, or plies joined with an adhesive. Three types of plywood are generally recognized: veneer plywood, lumber core plywood and particle board core plywood. Except for special constructions, the grain of one or more plies is approximately at right angles to that of the other plies and an odd number of plies is usually employed.

Broadly speaking, two classes of plywood are available—hard wood and soft wood. Most soft wood plywood is made of Douglas fir, but western hemlock, white fir, ponderosa pine, redwood and other species can also be used. Hardwood plywood is made of many species such as the high density class including ash, beech, birch, oak, and the like; medium density species such as bay, gum, cedar, and the like; and low density types such as aspen, chestnut, poplar, and the like. Commercial Standard CS 35–61, a publication of the U.S. Department of Commerce, lists various grades and types of plywood which may be used in this invention.

Since the wood coatings of this invention have such exceptional durability, it is possible to make a wider use of soft woods in the plywood construction, whereas with previous wood coatings at least a hardwood veneer was considered necessary. In many cases, low-grade and sometimes defective wood may be employed. The only requirement is that a sufficiently firm wood-material layer be present for the coating to adhere to.

Other wood materials include solid lumber, particle board, hardboard and other such materials produced from maple, beech, birch, cyprus, aromatic red cedar, redwood, balsam, fir, northern white pine, eastern hemlock, eastern spruce, southern yellow pine, Douglas fir, western red cedar, ponderosa pine, larch and other commercial species. Hardboard is a manufactured material made of reconstituted wood, utilizing the tiny threadlike fibers to build up sheets or boards, and particle board is a composition board consisting of distinct particles of wood bonded together with a synthetic resin or other added binder.

Organic coating compositions can be bonded to the wood base, according to this invention, by very uncomplicated means. The coating composition can be applied to the asbestos sheet material by a variety of methods, such as, for example, brushing, spraying, roll coating, or the like. When drying or baking of the coating is desired, or when a thermosetting resin is employed, the asbestos sheet material is then heated to the desired temperature, for instance, to about 500° F. to 300° F. for one to 30 minutes, respectively, until the coating cures, dries or fuses.

The coated asbestos sheet material can be easily bonded to the wood surface using conventional laminating adhesives, as well as standard laminating equipment and procedures, if desired. When plywood is utilized, the coated sheet can be applied either simultaneously with the lamination of the plywood itself or can be laminated to the surface of a completed plywood product. Where the former method is employed, pressure is used to bring the wood surfaces into intimate contact, such pressure varying primarily with the density of the wood used. The maximum pressure which may be applied is restricted by this invention only by the characteristics of the resin utilized in forming the coating.

The coated asbestos sheet material is sufficiently pliable so that even manually applied pressure, as, for example, by a hand roller, is sufficient to obtain adequate contact with the wood surface. For this reason, it is often preferred to apply the coated sheet to the surface of a wood product, such as plywood, which has already been subjected to any necessary pressure-lamination process. Such method is especially advantageous when non-plywood products, such as particle board or hardboard, are used since extensive laminating equipment and/or technnology, which might be unavailable, is rendered unnecessary.

The conventional adhesives which may be utilized are substances capable of holding materials together by surface attachments and generally cover a broad variety of cements, mucilages, paste and glue, with the particular application determining the specific adhesive. Among the most commonly used adhesive materials are the glues, such as: phenol resin glues, urea resin glues, resorcinol and phenol-resorcinol glues, polyvinyl resin emulsion glues, epoxy resin glues, melamine or melamine-urea glues and similar materials using varying amounts of water and/or extenders.

There are set forth below several examples which illustrate the nature and properties of the coating compositions of this invention. However, the invention should not be considered as being limited to their details. All parts and percentages are by weight and are based on resin solids content unless otherwise specified.

Example 1

A coating composition was prepared according to the following formulation:

| | Parts by weight |
|---|---|
| Poly(vinylidene fluoride) | 90 |
| Amide interpolymer | 10 |
| Titanium dioxide | 80 |
| Dimethyl phthalate | 360 |

The poly(vinylidene fluoride) has a melting point interval of 160° C. to 165° C. and a high molecular weight is indicated by its plasticity number of 3020. "Plasticity number" is an empirical index indicating relative molecular weight and is used because of the difficulty of obtaining a true solution of the polymer in order to make absolute molecular weight determinations.

The amide interpolymer was prepared according to the procedure described in U.S. Pat. No. 3,037,963, utilizing the following materials:

| | Parts by weight |
|---|---|
| Acrylamide | 50.0 |
| Methacrylic acid | 25.0 |
| Acrylonitrile | 200.0 |
| Ethyl acrylate | 725.0 |
| Butanol | 333.0 |
| Xylene | 333.0 |
| High-boiling aromatic solvent (B.P. 185–200° C.) | 334.0 |
| Tertiary dodecyl mercaptan | 27.5 |
| t-Butylperoxy isopropylcarbonate | 2.5 |

The pigment (titanium dioxide) was dispersed in the combined mixture by means of a pebble mill in a pigment-to-binder ratio of 0.42 to 1. The amide interpolymer was blended at room temperature with the poly(vinylidene fluoride) and the dimethyl phthalate, resulting in a composition having a solids content of 34 percent. This coating composition was then applied, in a 1 mil thickness (dry), to asbestos paper having the following properties:

| Property | Value | Test Method |
|---|---|---|
| Weight (lbs./100 sq. ft.) | 8.5 | ASTM D-646 |
| Density (lbs./cu. ft.) | 65 | ASTM D-1170 |
| Tensile strength (lbs./in.) | 30 | ASTM D-828 |

The composition was then cured at 500° F. for 1½ minutes, producing a smooth, hard, adherent coating on the asbestos paper.

The coated asbestos paper was then manually bonded, by means of a hand roller, to the surface of sections of a five-ply Douglas fir exterior grade plywood (area of 4″ x 4″ and thickness of ¾″), using a resorcinol-phenol-formaldehyde resin glue.

Three of the above coated plywood sections were then subjected to the following tests, a single and dissimilar test being given each sample:

*Soaking.*—The section is immersed in ambient temperature water for an 8-hour period and then dried by means of forced air circulation for 16 hours at 145° F., this procedure being continued for 25 cycles.

*Boiling.*—The section is immersed in boiling water for a 4-hour period and then dried by means of forced air circulation for 16 hours at 145° F., this procedure being continued for 25 cycles.

*Freezing.*—The section is immersed in ambient temperature water for an 8-hour period, followed by freezing at 0° F. or lower for 16 hours, followed by drying with forced air circulation for 24 hours at 145° F., this procedure being continued for 10 cycles.

After each cycle of each test the coated section is examined, with particular attention being given to adhesion, surface rupture and blistering. After completion of the three tests, each coated section was found to be unimpaired and displayed an overall aesthetic finish.

Example 2

A coating composition was prepared according to the following formulation:

| | Parts by weight |
|---|---|
| Amide interpolymer | 40 |
| Titanium dioxide | 20 |
| Butanol | 20 |
| Xylene | 20 |

The amide interpolymer was prepared as in Example 1 and contained the following materials:

| | Parts by weight |
|---|---|
| Acrylamide | 16 |
| Methacrylic acid | 4 |
| Acrylonitrile | 32 |
| Styrene | 40.5 |
| Butyl acrylate | 69 |
| Organopolysiloxane (Dow-Corning Z–6018) | 48.6 |
| Hydroxyethyl methacrylate | 5.4 |

The organopolysiloxane resin had the following properties:

| | |
|---|---|
| Total solids (percent) | 98 |
| Hydrogen content (percent) | 3.9 |
| Average molecular weight | 1600 |
| Refractive index | 1.531–1.539 |

The above coating composition was applied to asbestos paper (as used in Example 1) in a 1 mil (dry) thickness and cured for 60 seconds at 500° F. The coated asbestos sheet was then bonded to a plywood section as in Example 1.

Example 3

A coating composition was prepared according to the procedure of U.S. Pat No. 3,037,963 and contained the following monomers:

| | Parts by weight |
|---|---|
| Acrylamide | 100 |
| Methacrylic acid | 50 |
| Styrene | 550 |
| Ethyl acrylate | 1300 |

This composition was then applied to asbestos paper (as used in Example 1) in a 1 mil thickness (dry) and cured for 60 seconds at 500° F. The coated asbestos sheet was then bonded to a plywood section as in Example 1.

Example 4

A coating composition was prepared according to the following formulation:

| | Parts by weight |
|---|---|
| Amide interpolymer (as in Example 1) | 30 |
| Polyvinyl chloride (dispersing grade) | 30 |
| Vinyl chloride copolymer [1] | 20 |
| Dioctyl phthalate | 20 |
| Titanium dioxide | 80 |
| Epoxy resin [2] | 3 |

[1] 86 percent vinyl chloride, 13 percent vinyl acetate, 1 percent maleic acid, intrinsic viscosity 0.53 in cyclohexane at 20° C.
[2] Reaction product of 2,2-bis(4-hydroxyphenyl) propane and epichlorohydrin, having an epoxide equivalent of 175–210.

The titanium dioxide pigment was first dispersed in the amide interpolymer to obtain a paste consistency. The other ingredients were then added and the mixture was pebble milled to provide the final product.

The above composition was applied to asbestos paper (as in Example 1) to obtain a 1 mil thickness (dry) and cured at 500° F. for 60 seconds. The coated sheet was then bonded to a plywood section as in Example 1.

Example 5

A coating composition was prepared according to the following formulation:

| | Parts by weight |
|---|---|
| Polyvinyl chloride (dispersing grade) | 100 |
| Dioctyl phthalate | 55 |
| Epoxy resin (as in Example 4) | 5 |
| Stabilizer (Ba, Cd, Zn combination) | 3 |
| Carbon black | 3 |

The above materials were blended together at room temperature and the resulting composition was applied to asbestos paper, as in Example 1, to give a 10–15 mil thickness (dry). The cure schedule was 2 minutes at 450° F. The coated asbestos sheet was then bonded to a plywood section as in Example 1.

Example 6

A coating composition was prepared according to the following formulation:

| | Parts by weight |
|---|---|
| Chlorosulfonated polyethylene elastomer [1] | 100 |
| Toluene | 34 |
| Butanol | 100 |
| Mineral spirits | 25 |
| Tribasic lead maleate | 40 |
| Phthalic acid | 2 |
| Titanium dioxide | 10 |
| Tetraethyl thiuram disulfide | 1.5 |
| Phthalocyanine blue | 3 |

[1] A polymer prepared by the simultaneous chlorination and chlorosulfonation of polyethylene in solution with gaseous chlorine and sulfur dioxide, containing 1.25 percent sulfur as sulfonyl chloride and approximately 29 percent chlorine and having a specific gravity of 1.10.

The coating composition was prepared by stirring a pebble-milled mixture of the pigments and solvent into a solution of the polyethylene elastomer. The composition was then applied to asbestos paper as in Example 1 and cured at about 284° F. for approximately 30 minutes. The coated asbestos sheet was then bonded to a plywood section, as in Example 1.

Results similar to those described in Example 1 may also be obtained by employing other coating compositions, such as those described in Examples 2 to 6 and elsewhere in the specification. Desirable products in accordance with the invention can also be produced using particle board, hardboard, or solid lumber wood material in place of the plywood of the examples.

Although specific examples of the instant invention have been set forth hereinabove, it is not intended that the invention be limited solely thereto, but to include all the variations falling within the scope of the appended claims.

We claim:

1. A method of producing a durable weather resistant wood article which comprises
    applying to one surface of asbestos sheet material a coating comprising a heat-curable or heat-fusible organic resin,
    baking the coated asbestos at a temperature above about 180° F. to cure or fuse said coating, and
    bonding the coated asbestos to an exposed surface of a wood material base.

2. A method according to claim 1 wherein the asbestos layer is a sheet material containing a vehicle binder.

3. A method according to claim 2 wherein the asbestos sheet material is asbestos paper.

4. A method according to claim 1 wherein said organic resin comprises one or more resins selected from the group consisting of vinyl halide polymers, alkyd resins, hydrocarbon resins, acrylic resins, amino resins, epoxy resins, organopolysiloxane resins and phenolic resins.

5. A method according to claim 1 wherein the wood material is plywood.

6. A method according to claim 1 wherein the wood material is hardwood.

7. A method according to claim 1 wherein the wood material is particle board.

8. A method according to claim 1 wherein said organic resin comprises an interpolymer of an ethylenically unsaturated carboxylic acid amide and at least one other ethylenically unsaturated monomer, the interpolymer being reacted with an aldehyde and, optionally, being further reacted with an alcohol.

9. A method according to claim 1 wherein said organic resin comprises a blend of poly(vinylidene fluoride) and an aldehyde-modified ethylenically unsaturated carboxylic acid amide interpolymer.

10. A method according to claim 1 wherein said organic resin comprises the elastomeric product prepared by the simultaneous chlorination and chlorosulfonation of polyethylene.

11. A method according to claim 1 which comprises
    applying to one surface of an asbestos paper a coating comprising a heat-curable or heat-fusible organic resin,
    baking the coated asbestos paper at a temperature above about 180° F. to cure or fuse said coating to obtain a durable coating on said asbestos paper,
    bonding the cured or fused coated asbestos paper with a layer of adhesive material on the uncoated side of said coated asbestos to an exposed surface of a plywood base.

References Cited

UNITED STATES PATENTS

| 1,541,106 | 6/1925 | Brossler | 161—205 |
| 1,960,180 | 5/1934 | Cunningham | 161—205 |
| 1,987,506 | 1/1935 | Fitzpatrick | 161—205 |
| 2,021,348 | 11/1935 | Beckwith et al. | 161—205 |
| 2,107,901 | 2/1938 | Obermaier | 161—205 |
| 2,112,762 | 3/1938 | Chatfield | 161—205 X |
| 2,752,275 | 6/1956 | Raskin et al. | 161—104 |
| 2,880,090 | 3/1959 | Feigley | 117—126 X |
| 3,018,206 | 1/1962 | Hood et al. | 161—205 |
| 3,231,451 | 1/1966 | Gazelle | 161—205 X |
| 3,300,927 | 1/1967 | Bettoli | 161—205 |
| 3,415,674 | 12/1968 | Voisinet | 117—126 X |
| 3,427,216 | 2/1969 | Quinn | 161—205 |
| 3,442,730 | 5/1969 | Dietz | 161—205 X |
| 3,448,001 | 6/1969 | Jarvi | 161—261 |
| 3,464,543 | 9/1969 | Kwiatanowski et al. | 117—126 X |

HAROLD ANSHER, Primary Examiner

U.S. Cl. X.R.

117—54, 126; 161—182, 189, 205, 230, 250, 261